(12) United States Patent
Reck

(10) Patent No.: US 7,631,662 B2
(45) Date of Patent: *Dec. 15, 2009

(54) HOT/COLD FLUID ISOLATION VALVE

(76) Inventor: Michael E. Reck, One Appian Way, P.O. Box 59, Worcester, MA (US) 01613

( * ) Notice: Subject to any disclaimer, the term of this patent is extended or adjusted under 35 U.S.C. 154(b) by 0 days.

This patent is subject to a terminal disclaimer.

(21) Appl. No.: 11/928,660

(22) Filed: Oct. 30, 2007

(65) Prior Publication Data

US 2008/0142104 A1    Jun. 19, 2008

Related U.S. Application Data

(63) Continuation-in-part of application No. 10/573,094, filed on Dec. 18, 2006.

(51) Int. Cl.
*F16K 11/085* (2006.01)
(52) U.S. Cl. .................. 137/625.47; 137/878; 122/14.3
(58) Field of Classification Search ............ 137/625.22, 137/625.24, 625.47, 877, 878; 251/310; 122/13.01, 13.3, 14.3, 14.31
See application file for complete search history.

(56) References Cited

U.S. PATENT DOCUMENTS 4,479,459 A * 10/1984 Piper ........................... 122/379
5,632,300 A *  5/1997 Isringhausen ............... 137/269

* cited by examiner

*Primary Examiner*—John Fox
(74) *Attorney, Agent, or Firm*—Seyfarth Shaw LLP; Brian L. Michaelis

(57) ABSTRACT

A fluid isolation valve having a valve body with a first fluid flow port, a second fluid flow port and a fluid drain port with a valve in the fluid drain port. The valve body also defines a fluid flow channel, a drain flow channel and a valve portion, wherein the valve portion is disposed in the valve body to be communicated with the first fluid flow port, the second fluid flow port and the fluid drain port. At least one flow diversion device is also provided and is disposed within the valve portion. The flow diversion device is configurable between a first configuration and a second configuration, such that when the flow diversion device is in the first configuration the first fluid flow port is communicated with the second fluid flow port. Consequently, when the flow diversion device is in the second configuration the first fluid flow port is communicated with the fluid drain port. The fluid flow can be decreased or stopped by use of the valve within the fluid drain port.

5 Claims, 11 Drawing Sheets

HOT/COLD FLUID ISOLATION VALVE

CROSS REFERENCE TO RELATED APPLICATIONS

This patent application is a Continuation-in-Part of U.S. Utility application Ser. No. 10/573,094, filed on Dec. 18, 2006, which claims priority to U.S. Provisional Application Ser. No. 60/505,193, filed on Sep. 23, 2003, the contents of which are incorporated herein by reference in their entirety.

FIELD OF THE INVENTION

This invention relates generally to isolation valves and more particularly to isolation valves for an in-line appliance.

BACKGROUND OF THE INVENTION

Isolation valves are well known and are traditionally used in plumbing and heating applications to control the flow of water or other fluid to and from an in-line appliance or piece of equipment for purposes of maintenance, replacement or repair. However, current designs are large and bulky and do not allow for a full fluid flow. This is undesirable for many reasons. In-line appliances are typically disposed in limited spaces, thus the large bulky size of current designs make them cumbersome and difficult to install in limited spaces. In some cases the limited space makes them impossible to install, remove and/or repair. Furthermore, some in-line appliances, e.g. tankless water heaters, are tested by fluid flow rates and temperature calculations. Disadvantageously, the partial fluid flow capability of current designs makes it difficult for the in-line appliance to be accurately tested or subject to maintenance.

SUMMARY OF THE INVENTION

A fluid isolation valve is provided having a valve body with a first fluid flow port, a second fluid flow port and a fluid drain port with a valve in the fluid drain port. The valve body also defines a fluid flow channel, a drain flow channel and a valve portion, wherein the valve portion is disposed in the valve body to facilitate fluid communication with the first fluid flow port, the second fluid flow port and the fluid drain port. A flow diversion device is also provided and is disposed within the valve portion. The flow diversion device is configurable between a first configuration and a second configuration, such that when the flow diversion device is in the first configuration wherein the first fluid flow port is communicated with the second fluid flow port. Consequently, when the flow diversion device is in the second configuration the first fluid flow port is communicated with the fluid drain port.

Advantageously, the fluid isolation according to the invention allows testing of an installed in-line appliance and easy cleaning and flushing of any such in-line appliance.

BRIEF DESCRIPTION OF THE DRAWINGS

The foregoing and other features and advantages of the present invention will be more fully understood from the following detailed description of illustrative embodiments, taken in conjunction with the accompanying drawing in which.

DETAILED DESCRIPTION

Figure 1:
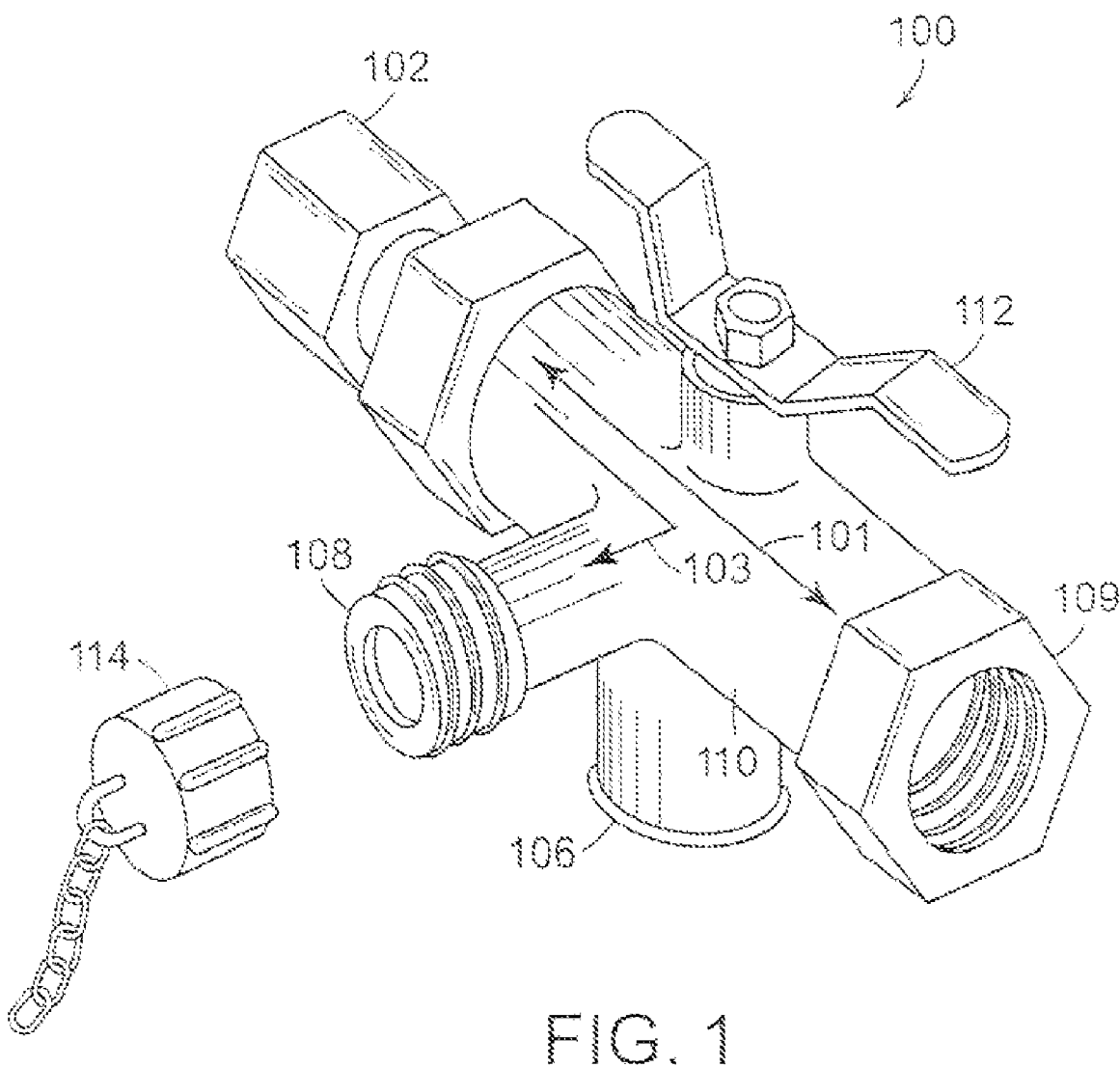
FIG. 1 is a perspective view of a first embodiment of a hot water isolation valve according to the invention in a first configuration.

Referring to FIG. 1, a hot water isolation valve 100 is shown and includes a first hot water port 102, a second hot water port 104, a hot water relief port 106 and a hot water drain port 108. Hot water isolation valve 100 defines a hot water flow channel 101 and a hot water drain channel 103. The hot water flow channel 101 provides fluid communication between the first hot water port 102 and the second hot water port 104. The hot water drain channel 103 provides fluid communication between the first hot water port 102 and the hot water drain port 108. The hot water isolation valve 100 includes a flow diversion device (not shown), such as a ball valve, disposed within a valve portion 110 disposed between first hot water port 102, second hot water port 104, hot water relief port 106 and hot water drain port 108. Moreover, the flow diversion device is configurable between a first configuration and a second configuration via a flow adjustment means 112, such as a lever, wing, oval or butterfly handle, for example.

Figure 2:
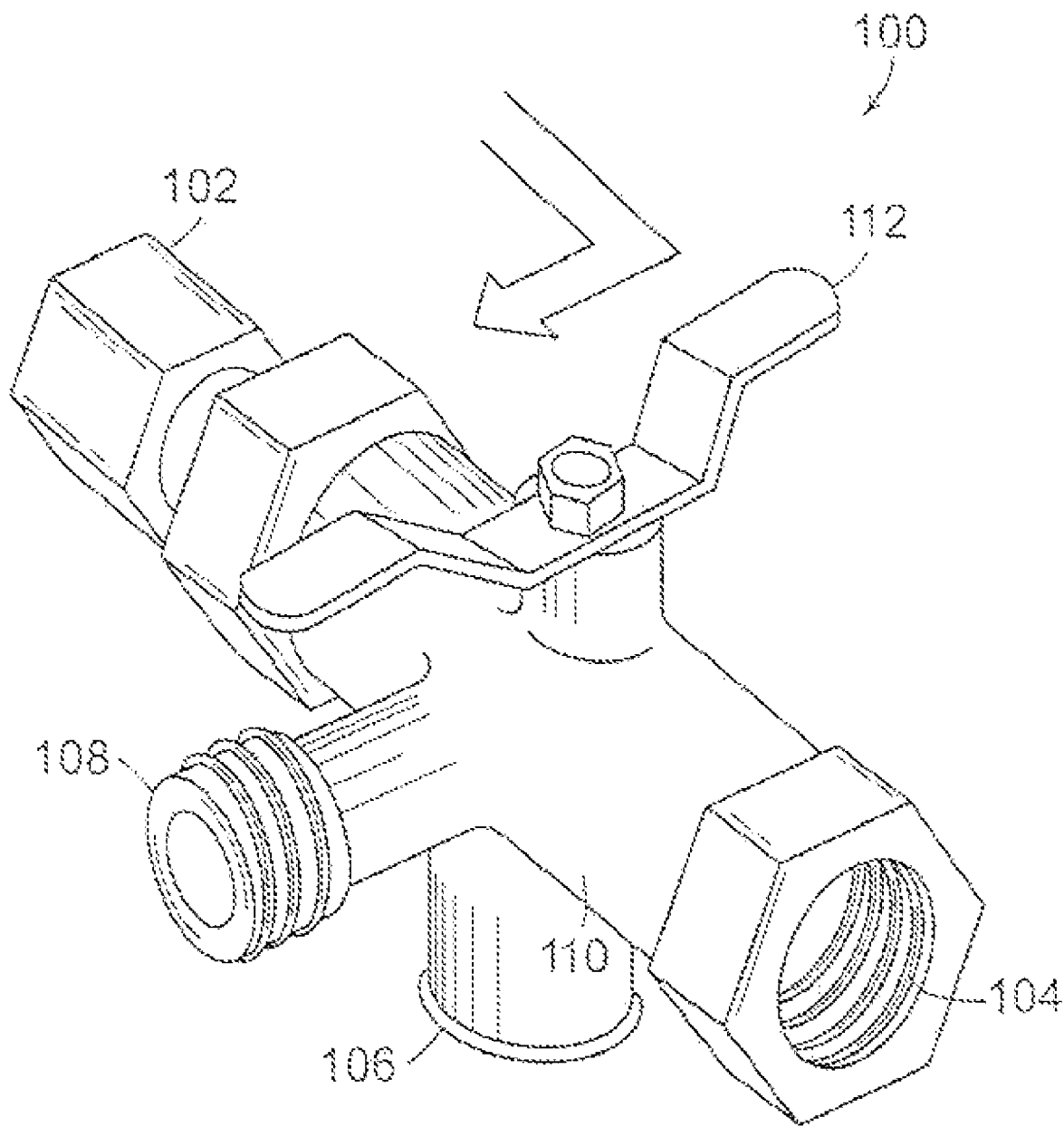
FIG. 2 is a perspective view of the hot water isolation valve of FIG. 1 in a second configuration.

In FIG. 1, the flow diversion device is shown in a first configuration wherein hot water flow is between first hot water port 102 and second hot water port 104. In FIG. 2, the flow diversion device is shown in a second configuration wherein hot water flow is between first hot water port 102 and hot water drain port 108. It should be noted that hot water relief port 106 includes a threaded portion (female) for receiving a hot water relief valve. However, although hot water relief port 106 is shown having a threaded (female) portion, it should be appreciated that hot water relief port 106 may be configured for connecting with a hot water relief valve in any manner suitable to the desired end purpose, such as a threaded portion (male), a friction fit connector, a crimped connector, a clamped connector, a quick disconnect connector, or the like. Additional embodiments of the invention included a pressure relief valve in communication with the pressure relief port 106. In certain embodiments the pressure relief valve can be built into the valve body or into the pressure relief port 106 thereof. Other embodiments can include a pressure relief valve that is external to the valve body and operably connected to the pressure relief port 106.

Illustrative embodiments of the present invention include a flow diversion device, such as a ball valve, which allows the hot water relief port 106 to be open in both configurations of the flow adjustment means 112. For example, in the first configuration, the hot water flow is between the first hot water port 102 and the second hot water port 104 and is also open to the hot water relief port 106. In the second configuration, the hot water flow is between the first hot water port 102 and the hot water drain port 108 and is also open to the hot water relief port 106. This allows fluid communication between the first hot water port 102 and the hot water relief port 106 regardless of configuration of the flow diversion device. A hot water relief valve can be provided in communication with the hot water relief port such that the hot water relief valve is always in fluid communication with the first hot water port 102. This embodiment provides an important safety feature which can prevent an overpressure condition in a system or appliance such as a tankless water heater to which the inventive hot water valve is installed.

Figure 3:
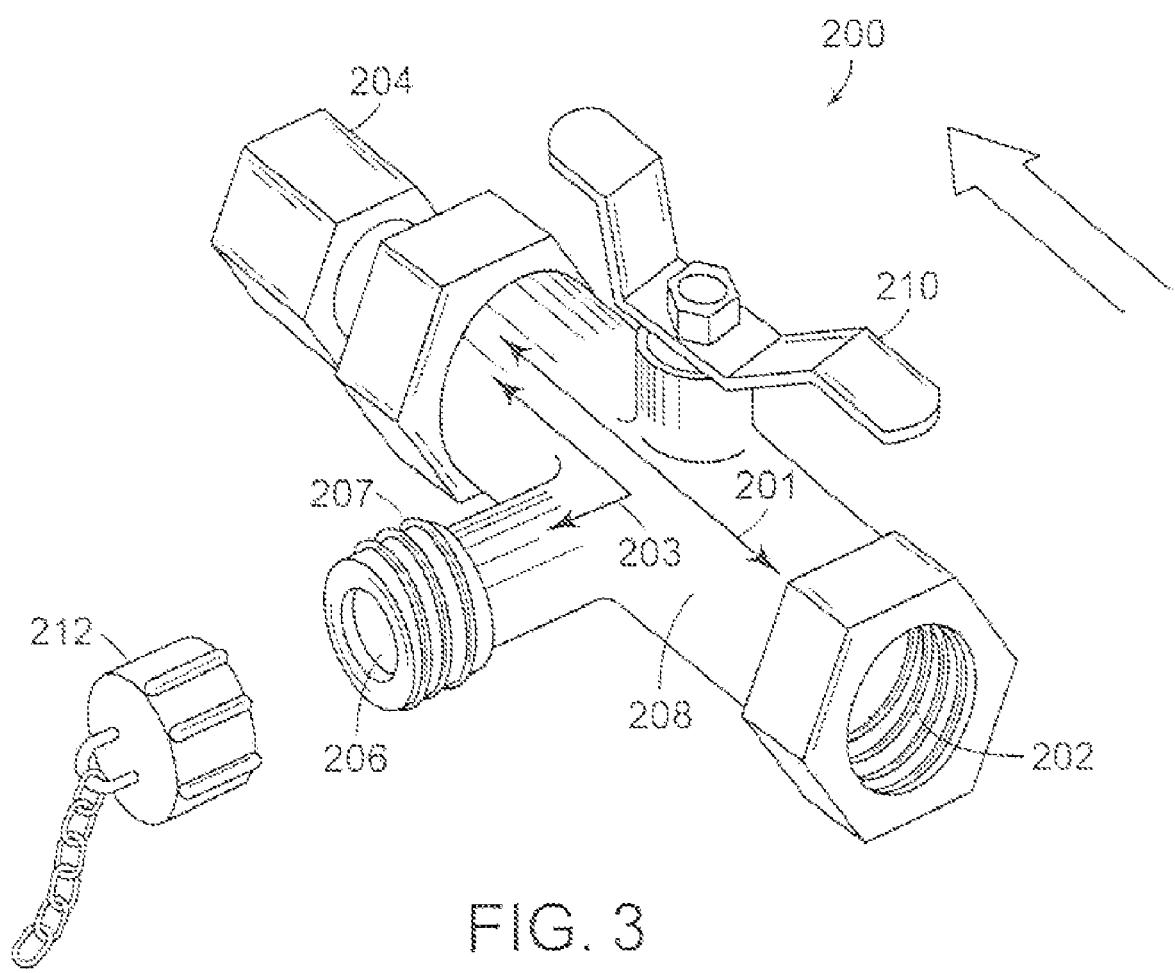
FIG. 3 is a perspective view of a second embodiment of a cold water isolation valve according to the invention in a first configuration.
Figure 4:
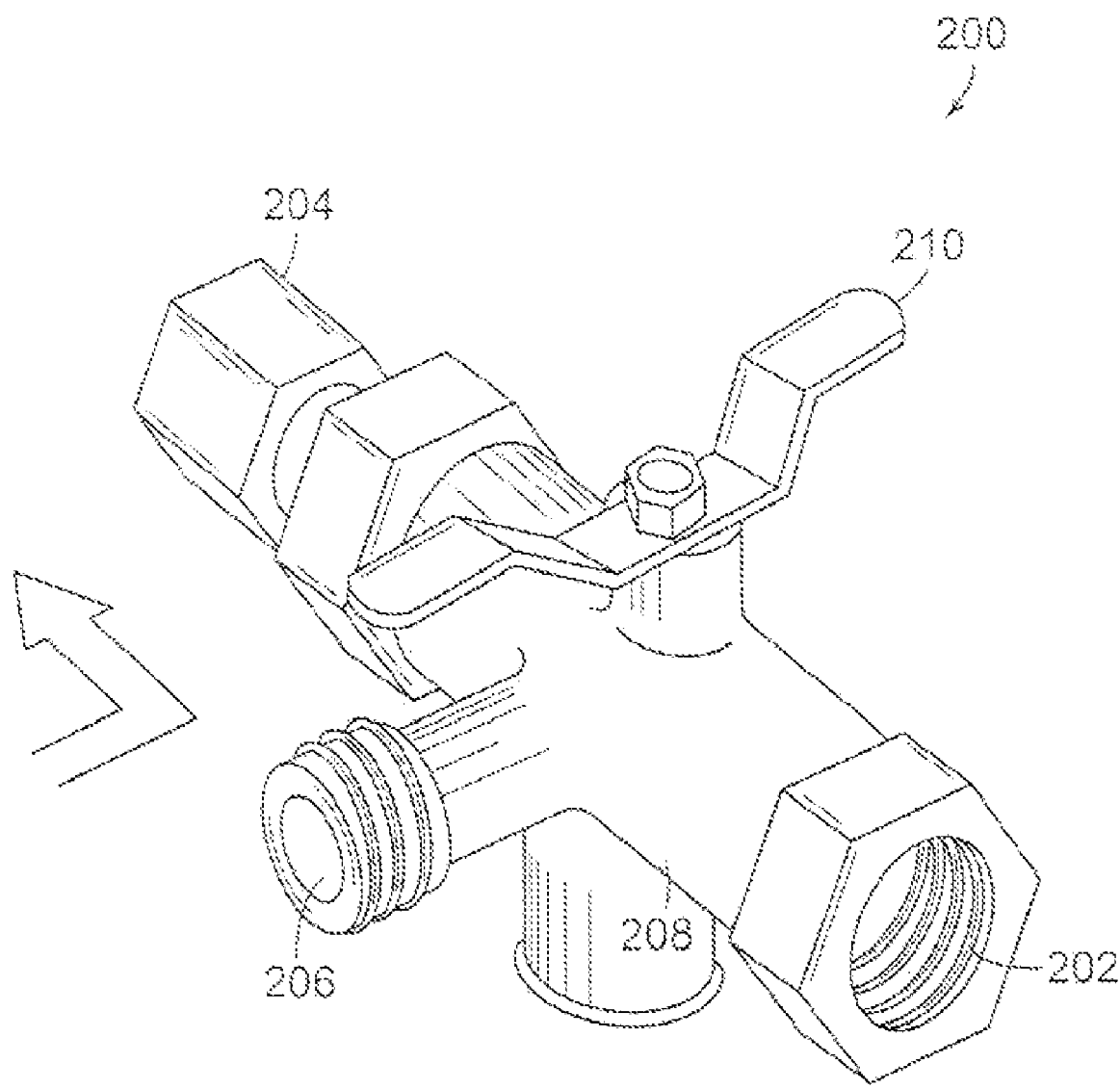
FIG. 4 is a perspective view of the cold water isolation valve of FIG. 3 in a second configuration.

Referring to FIG. 3, a cold water isolation valve 200 is shown and includes a first cold water port 202, a second cold water port 204 and a cold water drain port 206. Cold water isolation valve 200 defines a cold water flow channel 201 and a cold water drain channel 203, wherein cold water flow channel 201 is disposed to communicate first cold water port 202 with second cold water port 204 and wherein cold water drain channel 203 is disposed to communicate second cold water port 204 with cold water drain port 206. Cold water isolation valve 200 also includes a flow diversion device, such as a ball valve, disposed within a valve portion 208. Valve portion 208 is disposed between first cold water port 202, second cold water port 204 and cold water drain port 206. Moreover, the flow diversion device is configurable between a first configuration and a second configuration via a flow adjustment means 210. In FIG. 3, the flow diversion device is shown in a first configuration wherein cold water flow is between first cold water port 202 and second cold water port 204. In FIG. 4, the flow diversion device is shown in a second configuration wherein cold water flow is between second cold water port 204 and cold water drain port 206.

Figure 5A:
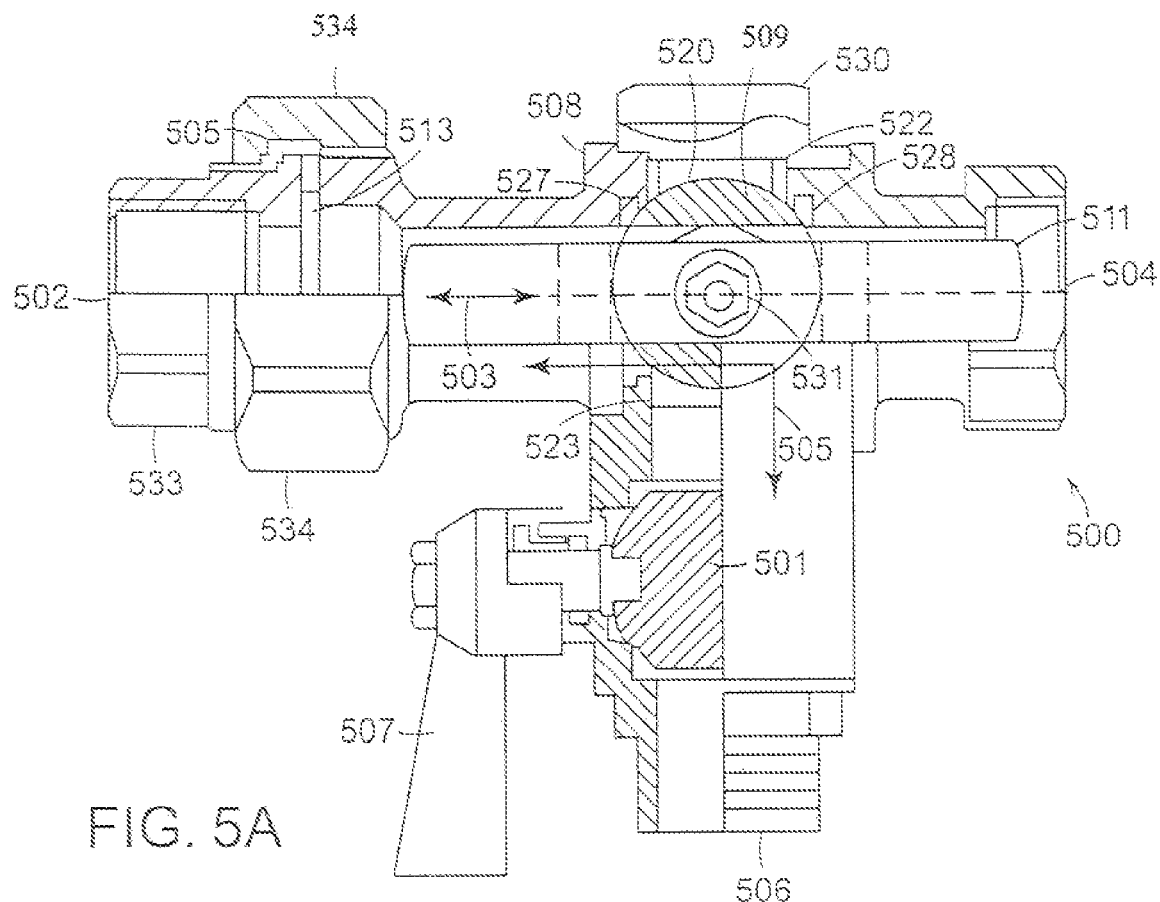
FIG. 5A is a perspective view of a third embodiment of a cold water isolation valve according to the invention.
Figure 5B:
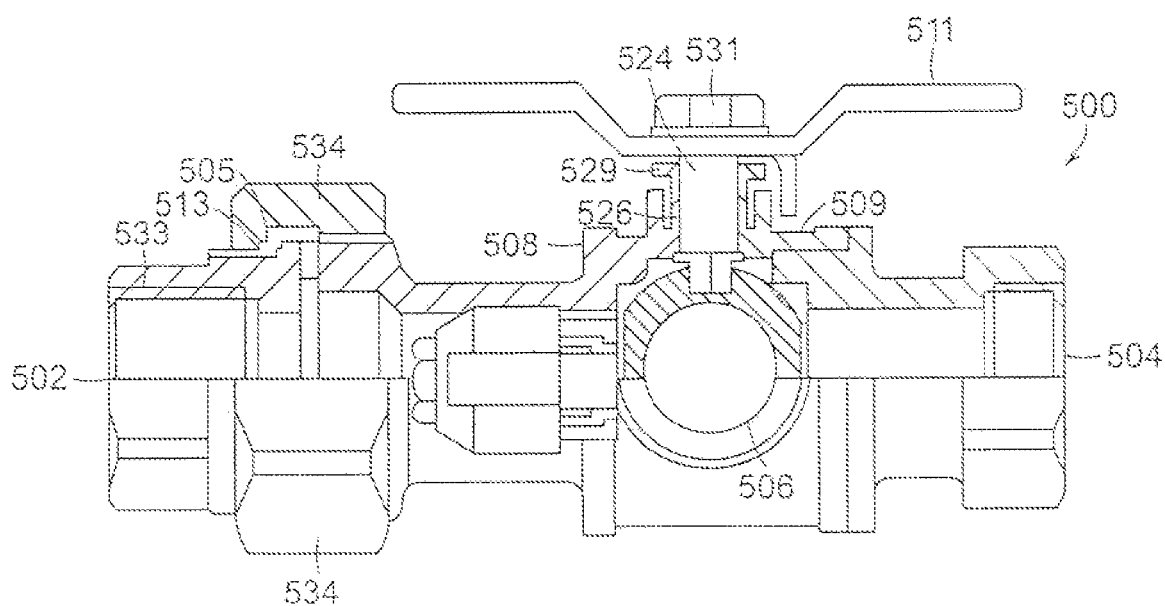
FIG. 5B is side view of the third embodiment of a cold water isolation valve according to the invention.

Referring to FIGS. 5A and 5B, a further illustrative cold water isolation valve 500 according to the invention is shown and includes a first cold water port 502, a second cold water port 504 and a cold water drain port 506 having a drain valve 501. In this further illustrative embodiment, the drain valve 501 is a ball valve fitted with a drain valve handle 507. The drain valve handle 507 is a one leaf handle that allows actuation of the drain valve 501 in a more compact valve design. It is contemplated within the scope of the invention that the drain valve 501 can be without a handle and be actuated by a set screw, any handle configuration or the like. It is also contemplated within the scope of the invention that the drain valve 501 can be other than a ball valve such as a traditional stem and valve seat design or the like.

The cold water isolation valve 500 defines a cold water flow channel 503 and a cold water drain channel 505, wherein the cold water flow channel 503 is disposed to communicate the first cold water port 502 with the second cold water port 504 and wherein the cold water drain channel 505 is disposed to communicate the first cold water port 502 with the cold water drain port 506. The cold water isolation valve 500 also includes a flow diversion device, such as a ball valve 509, disposed within a valve portion 508. The ball valve 509 is actuated with a butterfly handle 511. It is contemplated within the scope of this invention that the ball valve 509 can be actuated with a single lever handle, set screw, circular handle or the like. The valve portion 508 is disposed between the first cold water port 502, second cold water port 504 and cold water drain port 506. Moreover, the flow diversion device is configurable between a first configuration, i.e. to open the cold water flow channel 503, and a second configuration, i.e. to open the cold water drain channel 505, via the ball valve 509.

Turning to FIG. 5B, a cut-a-way side view of the flow diversion device is shown. In a first configuration, the cold water flow is between the first cold water port 502 and second cold water port 504. The ball valve 509 has a second configuration wherein cold water flow is between the first cold water port 502 and cold water drain port 506. Advantageously, the drain port 506 may be fitted with the drain valve 501, which allows a operator of the valve 500 the ability to check flow within the second configuration while affixing a drainage or pumping device to the cold water drain port 506. The first cold water port 502 has a union connection 533 with a threaded portion (female) allowing for reliable sealing of the cold water isolation valve 500 within a plumbing system. The union connection 533 has a union nut 534 that sealably attaches the cold water isolation valve to the plumbing system with the use of a union washer 513. The union connection 533 further contains an insulator 505 formed of a polymeric material. The insulator 505 precludes galvanic action that might occur when a nipple or a pipe connecting to the valve 500 is iron or a metal dissimilar to the valve 500.

The second cold water port 504 has a threaded portion (female) allowing for threaded engagement to the plumbing system. It is contemplated within the scope of the invention that either cold water port 502, 504 can have a union connection or threaded connection. It is further contemplated within the scope of the invention that either cold water port 502, 504 can have other means of attachment known in the art such as threaded portion (male), a friction fit connector, a sweat connection, a crimped connector, a clamped connector, a quick disconnect connector, flange or the like.

According to the invention, the ball valve 509 allows for at least two configurations of fluid flow. A ball 520 forming the ball valve 509 is seated within the valve body with a first polymeric valve seat 522, a second polymeric valve seat 523, a third polymeric valve seat 527 and a fourth polymeric valve seat 528. In one illustrative embodiment, the valve seats 522, 523, 527, 528 are formed of Teflon®. It is contemplated within the scope of the invention that any polymeric material having sufficient sealing qualities may be used. The ball valve 509 is positioned within the valve housing by way of a ball valve cap 530.

Affixed to the ball 520 is a valve stem 524. The valve stem 524 is sealably seated into the valve body with a polymeric valve stem seat 526 and a valve stem nut 529. Attached to the valve stem 524 is the butterfly handle 511 that is secured by the use of a handle nut 531. Within the ball 520 geometric channels allow for various flow diversions to and from the ports 502, 504 and cold water drain port 508.

Figure 6A:
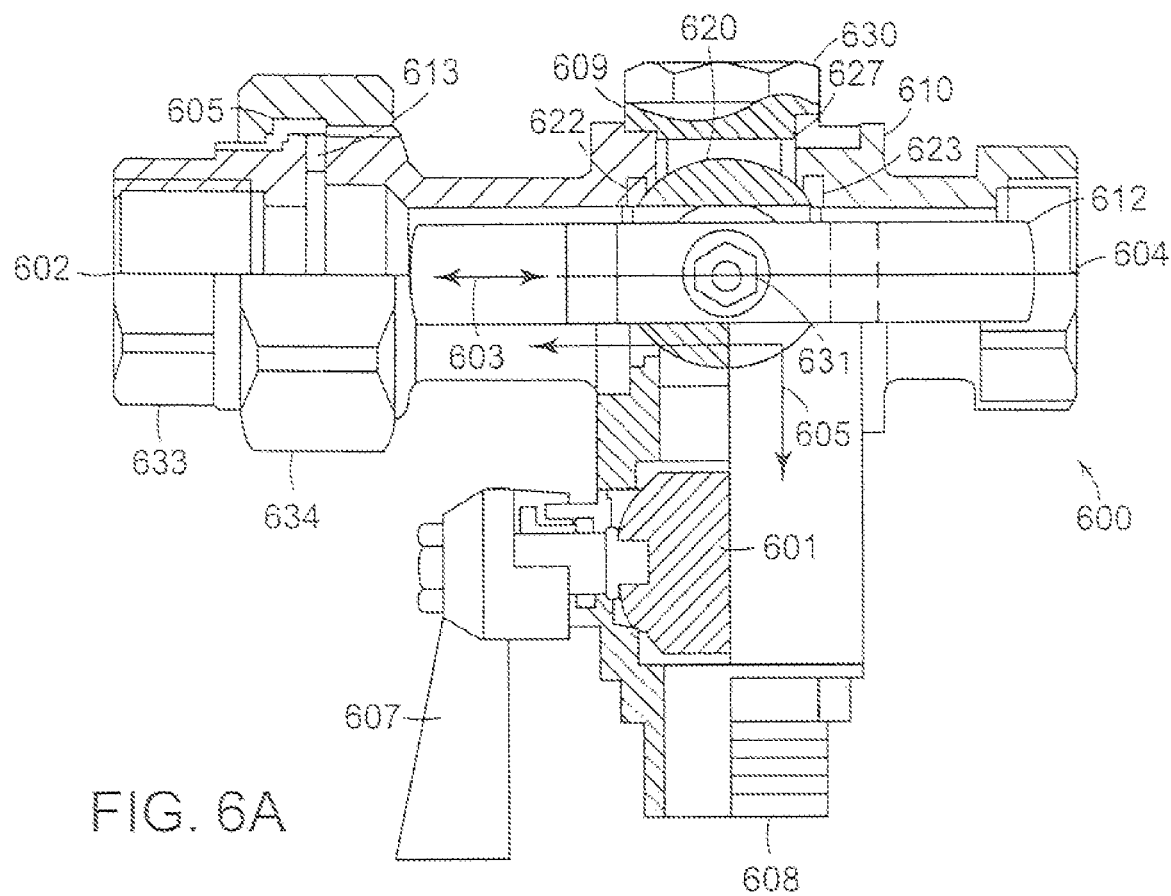
FIG. 6A is a perspective view of a third embodiment of a hot water isolation valve according to the invention.
Figure 6B:
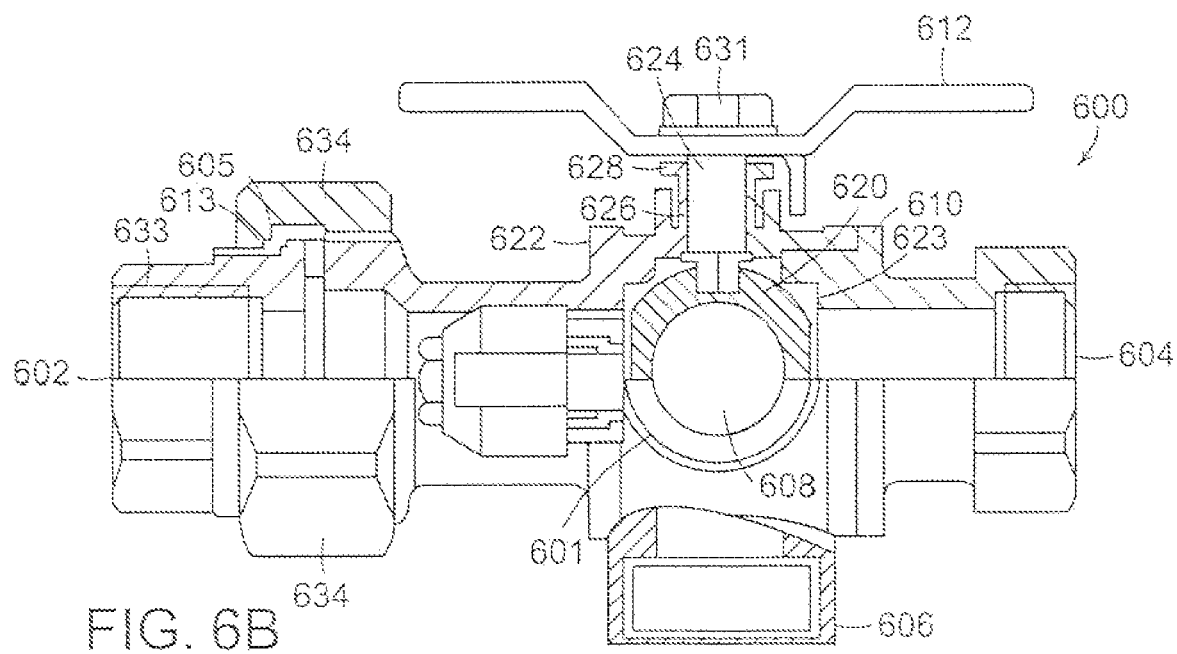
FIG. 6B is a side view of the third embodiment of a hot water isolation valve according to the invention.

Referring to FIGS. 6A and 6B, a hot water isolation valve 600 is shown and includes a first hot water port 602, a second hot water port 604, a hot water relief port 606 and a hot water drain port 608. The hot water drain port 608 is fitted with a drain port valve 601. The hot water isolation valve 600 defines a hot water flow channel 603 and a hot water drain channel 605. The hot water flow channel 603 provides fluid communication between the first hot water port 602 and the second hot water port 604. The hot water flow channel 603 is also open to the hot water relief port 606. The hot water drain channel 605 provides fluid communication between the first hot water port 602 and the hot water drain port 608 having a drain port valve 601. The hot water drain channel 605 is also open to the hot water relief port 606. The hot water isolation valve 600 includes a ball valve 609 as a flow diversion device, disposed within a valve portion 610 between first hot water port 602, second hot water port 604, hot water relief port 606 and hot water drain port 608 having the drain port valve 601. Moreover, the ball valve 609 is configurable between a first configuration and a second configuration via a handle 612. In a first configuration, the hot water flow is between first hot water port 602, second hot water port 604 and hot water relief port 606. In a second configuration the hot water flow is between first hot water port 602, hot water drain port 608 and hot water relief port 606.

According to the illustrative embodiments of invention, the hot water relief port 606 includes a threaded portion (female) for receiving a hot water relief valve. Although the hot water relief port 606 is shown having a threaded (female) portion, it should be appreciated that hot water relief port 606 may be configured for connecting with a hot water relief valve in any manner suitable to the desired end purpose, such as a threaded portion (male), a friction fit connector, a crimped connector, a clamped connector, a quick disconnect connector, or the like. Alternative embodiments of the invention can include a hot water relief valve that is incorporated with the hot water relief port rather than being connected thereto.

Turning to FIG. 6B, a cut-a-way side view of the flow diversion device is shown. In a first configuration hot water flow is between first hot water port 602 and second hot water port 604. The flow diversion device, ball valve 609, has a second configuration wherein hot water flow is between first hot water port 602 and hot water drain port 608. Advantageously, the drain port 608 is fitted with the drain valve (not shown), which allows a user of the hot water isolation valve 600 the ability to check flow within the second configuration while affixing a drainage or pumping device to the hot water drain port 608.

The first hot water port 602 has a union connection 633 with a threaded portion (female) allowing for reliable sealing of the hot water isolation valve 600 within a plumbing system. The union connection 633 has a union nut 634 that sealably attaches the hot water isolation valve 600 to the plumbing system with the use of a union washer 613. The union connection 633 has an insulator 605 formed of a polymeric material. The insulator 605 precludes galvanic action that might occur when a nipple or a pipe connecting to the valve 600 is iron or a metal dissimilar to the valve 600.

The second hot water port 604 has a threaded portion (female) allowing for threaded engagement to the plumbing system. It is contemplated within the scope of the invention that either hot water port 602, 604 can have a union connection or threaded connection. It is further contemplated within the scope of the invention that either hot water port 602, 604 can have other means of attachment known in the art such as threaded portion (male), a friction fit connector, a crimped connector, a clamped connector, a quick disconnect connector, or the like.

According to the invention, the ball valve 609 allows for at least two configurations of fluid flow. A ball 620 forming the ball valve 609 is seated within the valve body with a first polymeric valve seat 622, a second polymeric valve seat 623, a third polymeric valve seat 627 and a fourth polymeric valve seat 628. It one illustrative embodiment the valve seats 622, 623, 627, 628 are formed of Teflon®. It is contemplated within the scope of the invention that any polymeric material having sufficient sealing qualities may be used. The ball valve 609 is positioned within the valve housing by way of a ball valve cap 630. Affixed to the ball 620 is a valve stem 624. The valve stem 624 is sealably seated into the valve body with a polymeric valve stem seat 626 and a valve stem nut 628. Within the ball 620 geometric channels allow for various flow diversions to and from the ports 602, 604 and hot water drain port 608.

Figure 7A:
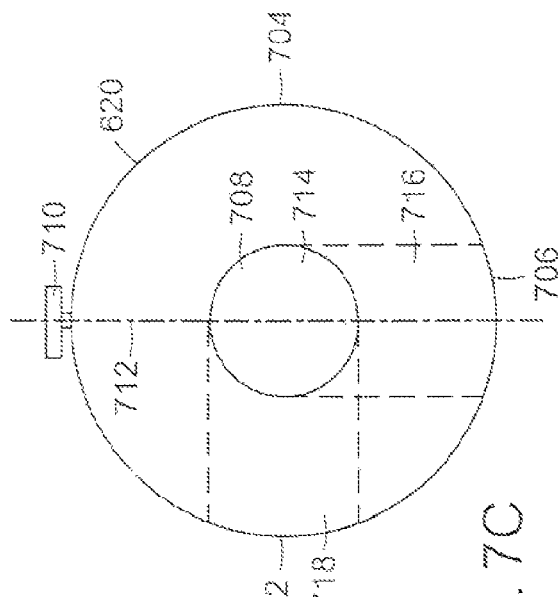
FIG. 7A is a schematic front view of ball portion of a ball valve in a first configuration according to an illustrative embodiment of the invention.
Figure 7B:
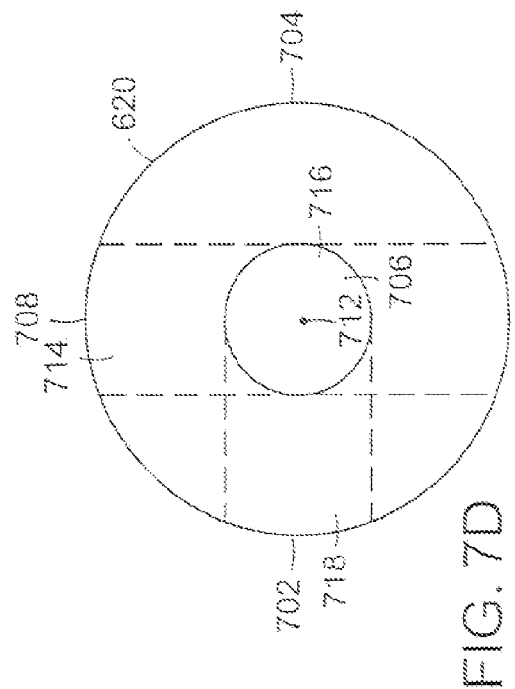
FIG. 7B is a schematic bottom view of ball portion of a ball valve in a first configuration according to an illustrative embodiment of the invention.

A more detailed description of the ball 620 forming ball valve 609 according to illustrative embodiments of the present invention is provided with referring to FIGS. 7A-7D. FIG. 7A is a schematic front view of the ball 620 in a first configuration wherein the rotational axis 712 is oriented vertically and handle 710 is rigidly attached to the top of ball 620 so that turning the handle 710 can rotate the ball about the rotational axis 712 within the ball valve 609 (FIG. 6B). When the ball is installed in a hot water valve, the schematic front view shown in FIGS. 7A and 7C coincide with a view into the hot water drain port with handle on top. In the first configuration, a through-hole 714 passes through the center of the ball 620 to provide an open flow path from a first hot water port 702 to a second hot water port 704. A first blind-hole 716 is co-axially aligned with the rotational axis 712 and passes from the ball surface that is opposite from the handle attachment point into the through hole 714 to provide a flow path to hot water pressure relief port 706. FIG. 7B is a schematic bottom view of the ball 620 in a first configuration wherein the rotational axis 712 is orthogonal to the page. A second blind hole 718 is orthogonal to a plane formed by the rotational axis 712 and the central axis of through hole 714. In the first configuration shown in FIG. 7B, a hot water drain port 708 is closed and the second blind hole 718 extends from the ball surface opposite the hot water drain port 708 to the ball center and intersects both the through hole 714 and the first blind hole 716.

Figure 7C:
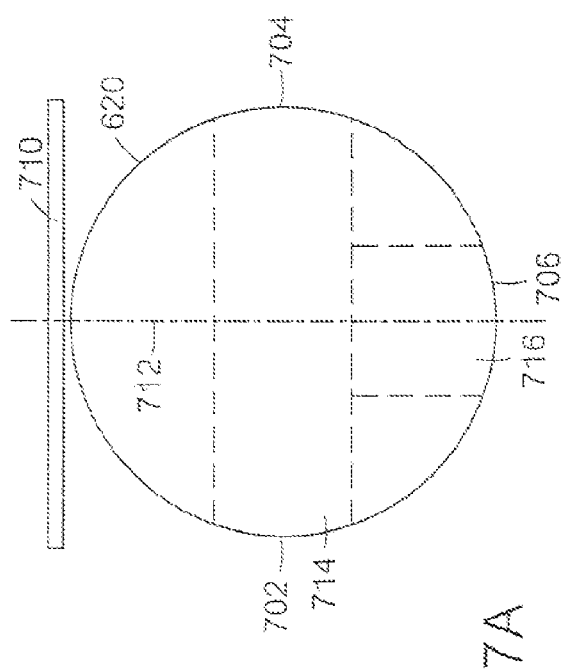
FIG. 7C is a schematic front view of ball portion of a ball valve in a second configuration according to an illustrative embodiment of the invention.
Figure 7D:
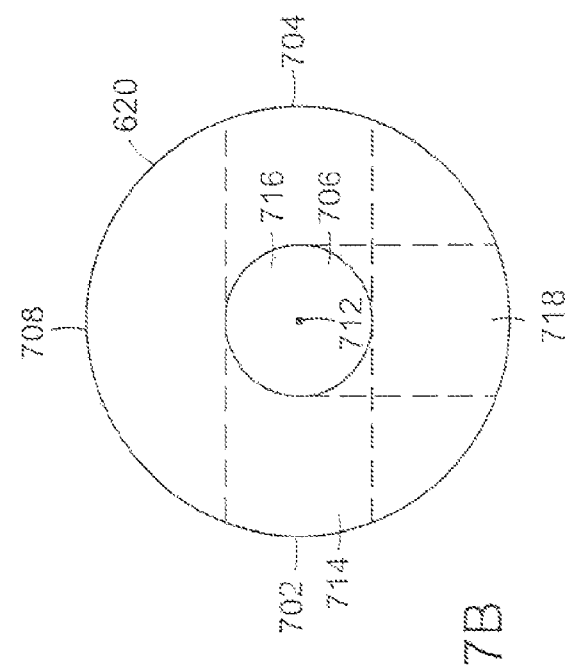
FIG. 7D is a schematic bottom view of ball portion of a ball valve in a second configuration according to an illustrative embodiment of the invention.

FIG. 7C is a schematic front view of the ball 620 in a second configuration wherein the rotational axis 712 is oriented vertically and handle 710 is rigidly attached to the top of ball 620 so that turning the handle 710 can rotate the ball about the rotational axis 712 within the ball valve 609 (FIG. 6B). In the second configuration, the through hole 714 is aligned with the hot water drain port 708 and the second blind hole 718 is aligned with the first hot water port 702 to provide an open flow path between the hot water drain port 708 and first hot water port 702. In the second configuration, no flow path is provided to second hot water port 704. Because the first blind hole 706 is coaxially aligned with the rotational axis 712, its always remains aligned with hot water relief port 706. This provides an open flow path between the hot water relief port 706 and first hot water port 702 in both first and second configurations. In the second configuration, the hot water relief port is also open to the hot water drain port 708. FIG. 7D is a schematic bottom view of the ball 620 in the second configuration wherein rotational axis 712 is orthogonal to the page. The ball as shown in FIG. 7D is rotated 90 degrees counterclockwise relative to the ball as shown in FIG. 7B while the locations of first hot water port 702, second hot water port 704, hot water drain port 708 and hot water pressure relief port 706 remain constant.

Figure 8:
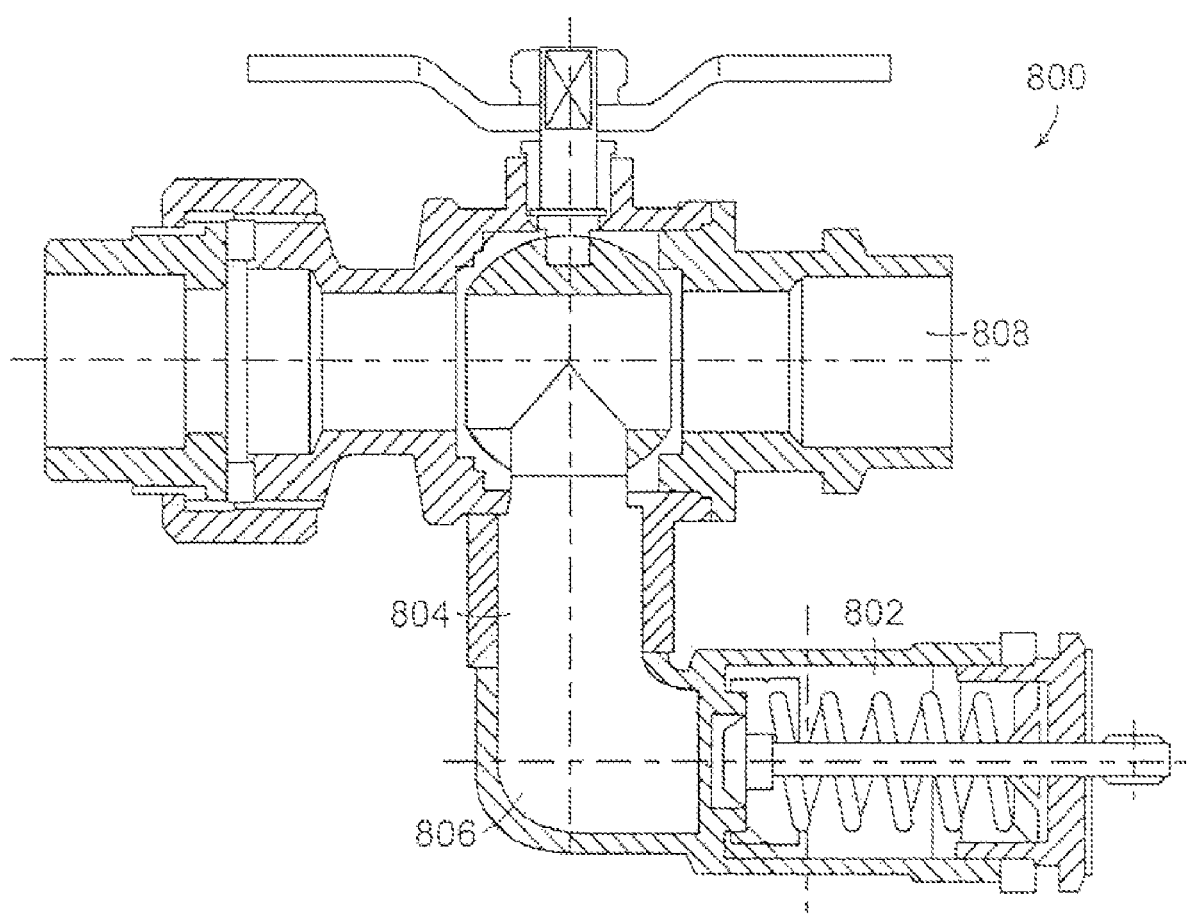
FIG. 8 is a cross-sectional view of a hot water isolation valve having hot water relief port and a hot water relief valve incorporated therein.

A cross sectional view of an illustrative embodiment of the present invention is shown in FIG. 8 in which a hot water relief valve 802 is built into the hot water relief port 806 of a hot water isolation valve 800. In this embodiment, the hot water relief valve 802 is oriented in parallel with the second hot water port. Although the illustrative embodiment is shown wherein the hot water relief port 804 includes a corner portion 806 so that the hot water relief valve 802 is oriented in parallel with the second hot water port 808, it should be appreciated by persons having skill in the art that the hot water relief port 804 can be provided with no corner portion 806 or with a corner portion formed with a different angle from that shown, without departing from the scope of the present invention.

Figure 9:
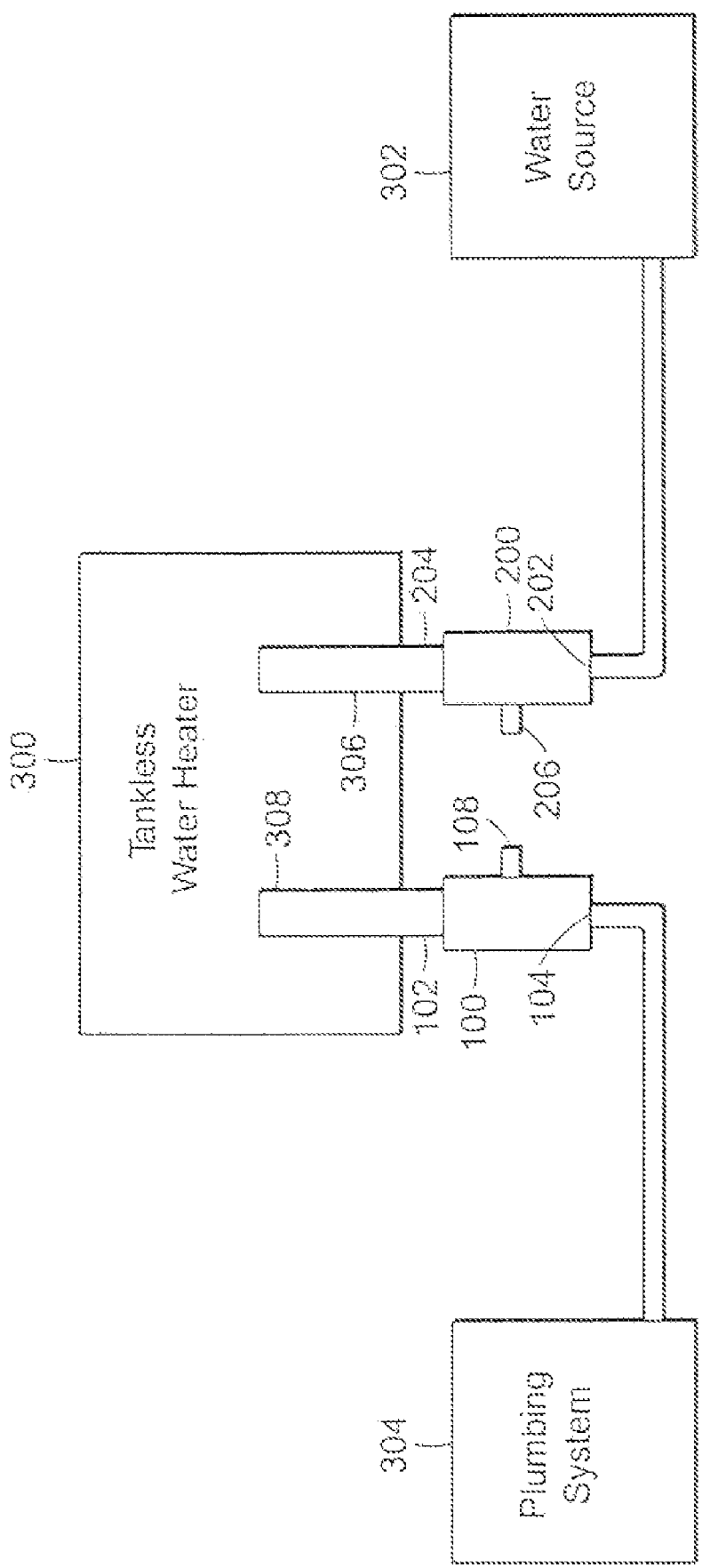
FIG. 9 is a diagrammatic representation of a tankless water heater disposed between a water source and a plumbing system.

Referring to FIG. 9, a typical in-line appliance set up is shown and includes a tankless water heater 300 connected between a water source 302 (such as a well or water main) and a plumbing system 304 (such as a plumbing system supplying a building), wherein tankless water heater 300 includes a first tankless water port 306 and a second tankless water port 308.

Referring to FIG. 9 and FIGS. 1-4, cold water isolation valve 200 is connected to water source 302 via first cold water port 202 and tankless water heater 300 via second cold water port 204 which is connected to first tankless water port 306. When the flow diversion device of cold water isolation valve 200 is in a first configuration, cold water is allowed to flow from water source 302, into first cold water port 202, through the cold water flow channel 201 (FIG. 3), out of second cold water port 204 and into first tankless water port 306. When the flow diversion device of cold water isolation valve 200 is in a second configuration, the flow path of cold water isolation valve 200 is between cold water drain port 206 and second cold water port 204 to facilitate draining the tankless water heater 300 via cold water drain channel 203 (FIG. 3). In the second position or configuration of the cold water isolation valve 200 the cold water is prevented from flowing into tankless water heater 300 via first cold water port 202. A cold water drain flow stop 212 (FIG. 3) or a drain valve may be provided for sealing off cold water drain port 206, thus completely preventing cold water from flowing through cold water isolation valve 200.

Hot water isolation valve 100 is connected to tankless water heater 300 via second tankless water port 308 which is connected to first hot water port 102. Additionally, hot water isolation valve 100 is connected to plumbing system 304 via second hot water port 104. When the flow diversion device of hot water isolation valve 100 is in a first configuration, hot water is allowed to flow from second tankless water port 308, into first hot water port 102 through the hot water flow channel 101 (FIG. 1), out of second hot water port 104 and into plumbing system 304. When the flow diversion device of hot water isolation valve 100 is in a second configuration, hot water is allowed to flow from second tankless water port 308, into first hot water port 102 through the hot water drain channel 103 (FIG. 1) and out of hot water drain port 108 to facilitate draining the hot water side of the system (and emptying the tankless water heater). In the second configuration, water is prevented from flowing into plumbing system 304. A hot water drain flow stop 114 (FIG. 1) or drain valve may be provided for sealing off hot water drain port 108, thus preventing water from flowing through hot water isolation valve 100.

This above described design advantageously allows for tankless water heater 300 and/or plumbing system 304 to be drained or flushed out. For example, when the flow diversion device of cold water isolation valve 200 is in the second configuration, a flushing device containing a flushing fluid, such as water or chemical solvent, may be connected to cold water drain port 206 to inject the flushing fluid into cold water drain port 206. The flushing fluid will flow through cold water drain channel 203, out of second cold water port 204, into first tankless water port 306 and through tankless water heater 300. The flushing fluid will then flow out of second tankless water port 308 and into first hot water port 102. If the flow diversion device of hot water isolation valve 100 is in the second configuration, the allowable flow path of the flushing fluid is between first hot water port 102 and hot water drain port 108, advantageously allowing tankless water heater 300 to be flushed. It should be appreciated that the above described flushing may also be performed in a reverse manner using hot water drain port 108 as an inlet flow port and cold water drain port 206 as an outlet flow port.

It is contemplated that one objective of this valve is to isolate the cold water feed and the hot water piping to a plumbing system so that the water heater can be replaced. These tankless on-demand water heaters typically mount onto a wall with fastening devices. To replace the unit, the valves can be shut off, the unions (e.g. first hot water port 102 and second cold water port 204) disconnected and the water heater removed from the wall. The drain ports having valves will be used to test the system and flush out the water heater with chemicals when the water source 302 and plumbing system 304 are disconnected. The drain port valves allow an operator to control the flow of fluids through the tankless water heater 300, which allows an operator greater convenience and safety for testing and flushing operations. A pressure relief valve threaded into the hot water isolator valve will always be open to the water heater no matter what position the ball is in because the hole will be opposite the stem.

This innovative design will advantageously save space and time and offer a full fluid flow. The full fluid flow of the drain is important because the hot water heater is tested by fluid flow and temperature calculation. Moreover, space is also critical because these units are installed in small spaces. This design is less than half the length of current designs advantageously allowing these new isolation valves to be used in small spaces.

A cold water isolation valve and a hot water isolation valve may be packaged together. Moreover, it should be appreciated that any size valve and configuration suitable to the desired end purpose may be used.

It should be appreciated that first hot water ports 102 and first cold water ports 204 are union connections, as is known in the art, for connecting hot water isolation valve 100 and cold water isolation valve 200 to tankless water heater 300.

Although embodiments of the present invention have been described herein in terms of hot water isolation valves and cold water isolation valves illustratively having a single flow diversion device such as a ball valve dispose within a valve portion, it should be understood that more than one flow diversion device can be disposed within a single valve portion, within the scope of the present invention. A hot water isolation valve having more than one flow diversion device according to an alternative embodiment of the present invention is described in FIG. 10.

Figure 10:
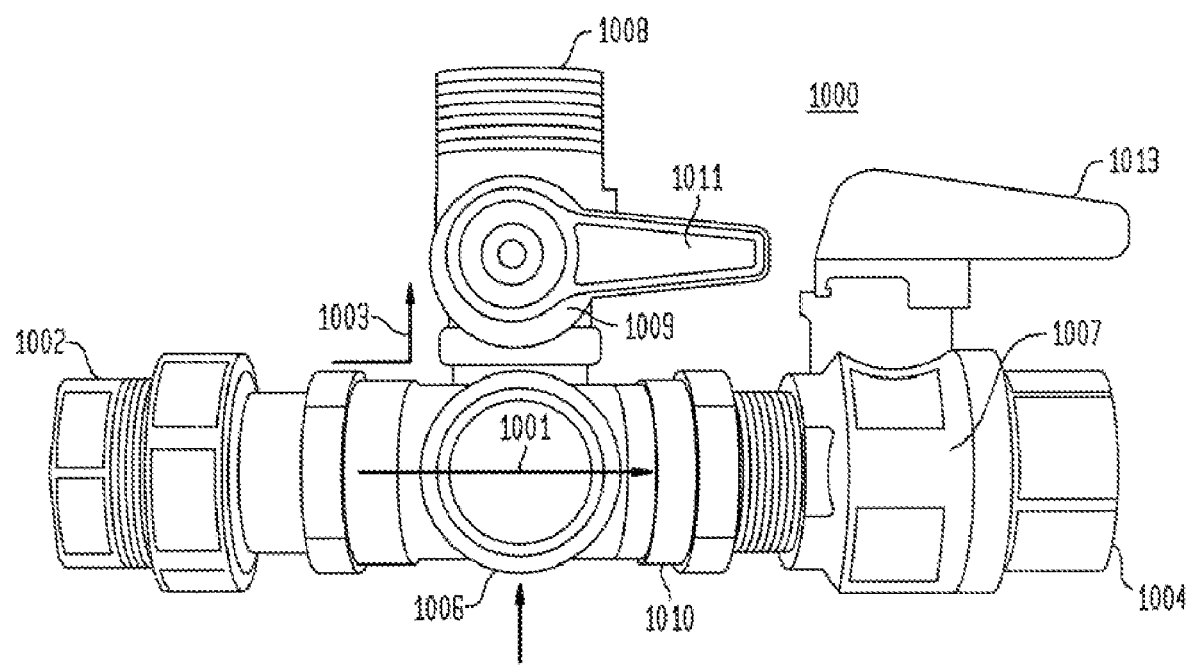
FIG. 10 is a side view of a hot water isolation valve having more than one flow diversion device according to an illustrative embodiment of the invention.

Referring to FIG. 10, a hot water isolation valve 1000 is shown and includes a first hot water port 1002, a second hot water port 1004, a hot water relief port 1006 and a hot water drain port 1008. Hot water isolation valve 1000 defines a hot water flow channel 1001 and a hot water drain channel 103. The hot water flow channel 1001 provides fluid communication between the first hot water port 1002 and the second hot water port 1004. The hot water drain channel 1003 provides fluid communication between the first hot water port 1002 and the hot water drain port 1008.

The hot water isolation valve 1000 illustratively includes two flow diversion devices 1007, 1009 disposed within a valve portion 1010. A first flow diversion device 1009 disposed proximate to the hot water drain port 1008 and adapted to open or close the hot water drain port in response to movement of a first flow adjustment means 1011. A second flow diversion device 1007 is disposed proximate to the second hot water port 1004 and adapted to open or close the second hot water port 1004 in response to movement of a second flow adjustment means 1013. The flow diversion devices are configurable between a first configuration and a second configuration via the first flow adjustment means 1011 and the second flow adjustment means 1013. The first flow adjustment means 1011 and the second flow adjustment means 1013 can be levers, wings, ovals or butterfly handles, for example.

In the first configuration of the hot water isolation valve 1000 shown in FIG. 10, the first flow diversion device 1011 is positioned to close the hot water drain port 1008 and the second flow diversion device 1013 is positioned to open the second hot water port 1004. In the second configuration of the isolation valve 1000, the first flow diversion device 1011 is positioned to open the hot water drain port 1008 and the second flow diversion device 1013 is positioned to close the second hot water port 1004. This allows fluid communication between the first hot water port 1002 and the hot water relief port 1006 regardless of configuration of the flow diversion devices. A hot water relief valve can be provided in communication with the hot water relief port such that the hot water relief valve is always in fluid communication with the first hot water port 1002. This embodiment maintains the important safety feature of the previously described embodiments which can prevent an overpressure condition in a system or appliance such as a tankless water heater to which the inventive hot water valve is installed.

Although an exemplary embodiment of hot water isolation valves and cold water isolation valves includes a forged brass construction, hot water isolation valves and cold water isolation valves may be constructed, in whole, in part or in combination, using any material suitable to the desired end purpose, such as cast brass, copper, iron, plastic and/or a composite material, such as polycarbonate. Moreover, although connections between hot water isolation valves, cold water isolation valves plumbing system and tankless water heater are shown and described as threaded screw type connections, it should be appreciated that these connections may be any connections suitable to the desired end purpose, such as friction fit connectors, crimped connectors, clamped connectors, quick disconnect connectors, or the like.

Although an exemplary embodiment of hot water isolation valves and cold water isolation valves show their use in connecting a tankless water heater to a plumbing system, it should be appreciated by those skilled in the art that the inventive isolation valves can be used to attach and isolate other plumbing appliances or plumbing systems known in the art within an overall plumbing system.

Figure 11:
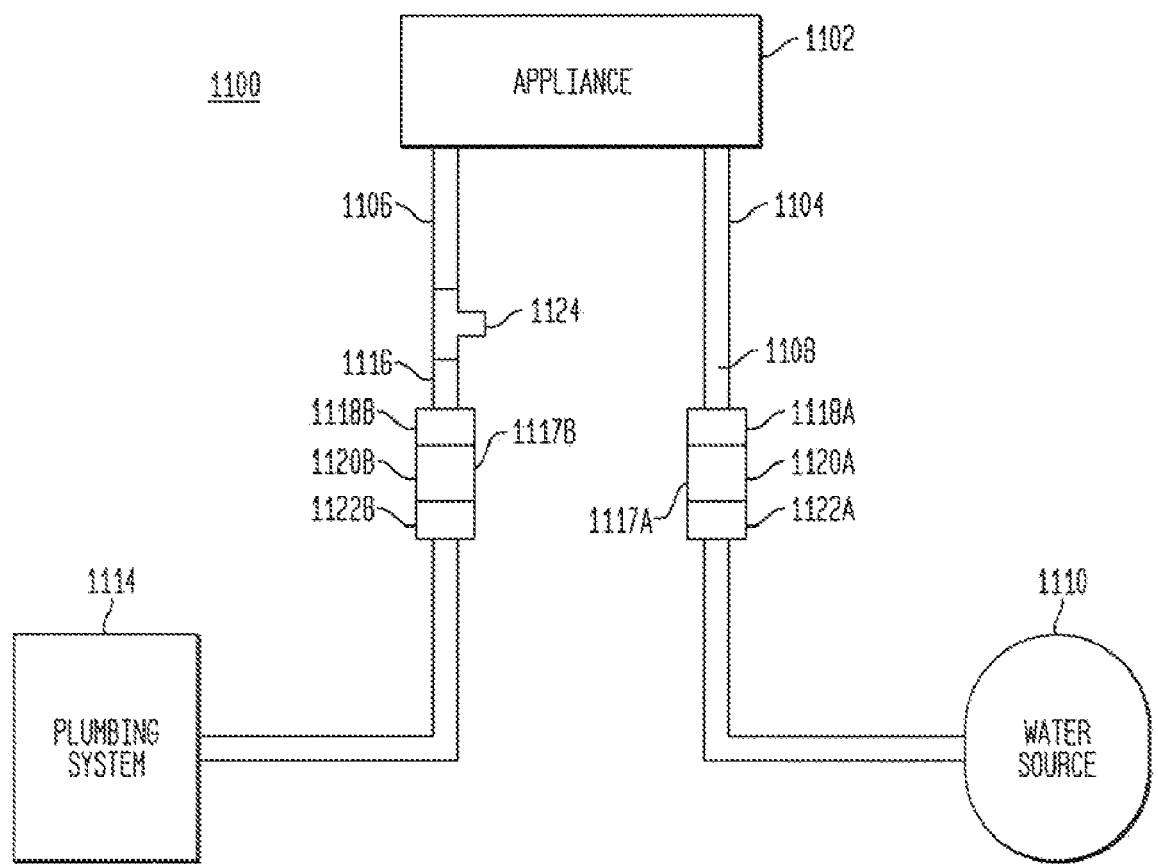
FIG. 11 is a diagrammatic representation of a system for purging an appliance according to an illustrative embodiment of the invention.

An illustrative embodiment of the invention includes a system for purging an appliance as shown in FIG. 11. The system 1100 includes an appliance 1102 having a fluid input port 1104 and a fluid outflow port 1106. A source conduit 1112 and valve apparatus 1117A connects the fluid input port 1104 to a water source 1110. An outflow conduit 1116 and valve apparatus 1117B connects the fluid output port 1106 to a plumbing system 1114. The valve apparatus 1117A, 1117B each include a union portion 1118A,B, a drain portion 1120A,B, and a valve portion 1122A,B. A pressure relief port 1124 is illustratively provided as a T connection between the fluid output port 1106 and the valve apparatus 1117B. A pressure relief valve (not shown) can be mounted to the pressure relief port 1124.

The union portion 1118A, of valve apparatus 1117A, connects the drain portion 1120A, to the fluid input port 1104 via the source conduit 1112. The drain portion 1120 A, connects the valve portion 1122A to the source conduit 1112 via the union portion 1118A. The valve portion 1117A connects the drain portion 1120A to the water source 1110. The drain portion 1120A provides a closable fluid flow path for draining fluid from the appliance 1102 via the fluid input port 1104 while the valve portion 1122A provides means for opening and closing a flow path to the water source 1110.

The union portion 1118B, of valve apparatus 1117B, connects the drain portion 1120B, to the fluid outflow port 1106 via the outflow conduit 1116. The drain portion 1120 B, connects the valve portion 1122B to the outflow conduit 1116 via the union portion 1118B. The valve portion 1117B connects the drain portion 1120B to the plumbing system 1114. The drain portion 1120B provides a closable fluid flow path for draining fluid from the appliance 1102 via the fluid outflow port 1106 while the valve portion 1122B provides means for opening and closing a flow path to the plumbing system 1114.

The appliance 1102 can be purged of fluids by closing the valve portions 1122A,B to isolate the appliance 1102 from the water source 1110 and the plumbing system 1114 while opening the drain portions 1120A,B, to provide a drain path from the fluid input port 1104 and a drain path from the fluid outflow port 1106. The pressure relief port 1124 provides safety by allowing fluid under pressure to escape from the system, for example, if the valve portions 1122A,B and the drain portions 1120A,B are all closed.

Although various embodiments of the present invention are described and/or illustrated as having a first flow path in line with a second flow path and as having a drain path orientation 90° or 180° with respect to a relief path, persons having ordinary skill in the art should appreciate that the various ports and flow paths described herein can be oriented in virtually any plane or direction in relation to each other within the scope of the present invention.

Although the invention has been shown and described with respect to exemplary embodiments thereof, various other changes, omissions and additions in the form and detail thereof may be made therein without departing from the spirit and scope of the invention.

The invention claimed is:

1. A fluid isolation valve comprising:
   a valve body having a first fluid flow path, a second fluid flow path, a fluid drain path, a hot water relief path and a pressure relief valve in communication with said hot water relief path; and
   at least one flow diversion device configurable between a first configuration and a second configuration, such that when the flow diversion device is in the first configuration the first fluid flow path is communicated with the second fluid flow path and the hot water relief path, and when the flow diversion device is in the second configuration, the first fluid flow path is communicated with the fluid drain path and the hot water relief path.

2. The fluid isolation valve of claim 1 wherein the flow diversion device comprises at least one ball section.

3. The fluid isolation valve of claim 2 wherein when the flow diversion device is in the first configuration the at least one ball section is adapted to provide an open flow channel between the first fluid flow path, the second fluid flow path and the hot water relief path and is adapted to close the fluid drain path; and wherein when the flow diversion device is in the second configuration the at least one ball section is adapted to provide an open flow channel between the first fluid flow path, the fluid drain path and the hot water relief path and is adapted to close the second fluid flow path.

4. The fluid isolation valve of claim 3 wherein the at least one ball section comprises a first ball section in the fluid drain path and a second ball section in the second flow path.

5. The fluid isolation valve of claim 1 wherein the valve body is monolithically constructed.

* * * * *

UNITED STATES PATENT AND TRADEMARK OFFICE
CERTIFICATE OF CORRECTION

Page 1 of 1

PATENT NO. : 7,631,662 B2
APPLICATION NO. : 11/928660
DATED : December 15, 2009
INVENTOR(S) : Michael E. Reck It is certified that error appears in the above-identified patent and that said Letters Patent is hereby corrected as shown below:

Column 1, lines 6-10 should read as follows:

This Patent Application is a Continuation-in-Part of U.S. Utility Application Serial No. 10/573,094, filed on December 18, 2006, which is the U.S. national phase filing of International Patent Application No. PCT/US04/31167 filed on September 23, 2004, which claims priority to U.S. Provisional Application Serial No. 60/505,193, filed on September 23, 2003, the contents of which are incorporated herein by reference in their entirety. This Patent Application claims priority to each of the applications mentioned above.

Signed and Sealed this
Twenty-fourth Day of July, 2012

David J. Kappos
*Director of the United States Patent and Trademark Office*